June 12, 1962 K. F. BECKER 3,038,572
PRESSURE CLIPS FOR CEILING MEMBERS IN CORNER MOLDING
Filed July 27, 1959 2 Sheets-Sheet 1
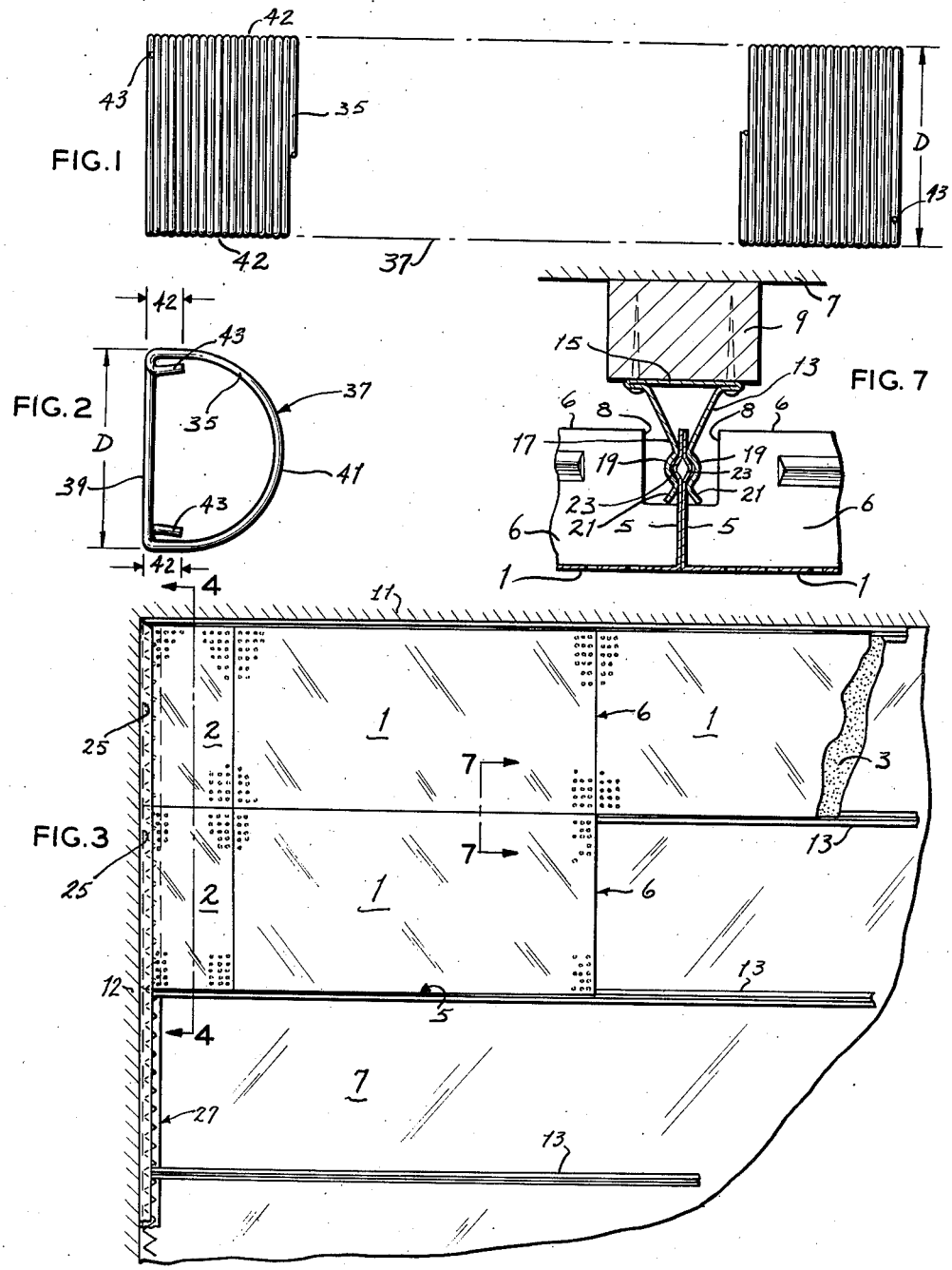

June 12, 1962    K. F. BECKER    3,038,572
PRESSURE CLIPS FOR CEILING MEMBERS IN CORNER MOLDING
Filed July 27, 1959    2 Sheets-Sheet 2

Kenneth F. Becker,
Inventor.
Koenig and Pope
Attorneys.

United States Patent Office 3,038,572
Patented June 12, 1962

3,038,572
PRESSURE CLIPS FOR CEILING MEMBERS IN CORNER MOLDING
Kenneth F. Becker, Hanley Hills, Mo., assignor to Kenbeck Company, St. Louis, Mo., a corporation of Missouri
Filed July 27, 1959, Ser. No. 829,572
1 Claim. (Cl. 189—88)

This invention relates to pressure clips for ceiling members in corner moldings, and with regard to certain more specific features, to such clips for use in aligning acoustical and similar ceiling pans or panels with such molding.

Among the several objects of the invention may be noted the provision of a molding clip for use with corner molding providing for securement between the molding and an unflanged pan end; the provision of a clip of the class described which will provide a line intersection of good appearance between a cut or like pan end and the lower molding flange; and the provision of a clip of this class which may be manufactured as a simple compact nontangling unit adapted conveniently to be prepared for use and applied. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claim.

In the accompanying drawings, in which one of various possible embodiments of the invention is illustrated, FIG. 1 is a front view of a spring clip unit made according to the invention;

FIG. 2 is a left-end view of FIG. 1;

FIG. 3 is a bottom plan view of a corner of a partly constructed ceiling, illustrating application of the invention;

Corresponding reference characters indicate corresponding parts throughout the several views of the drawings.

Figure 4:
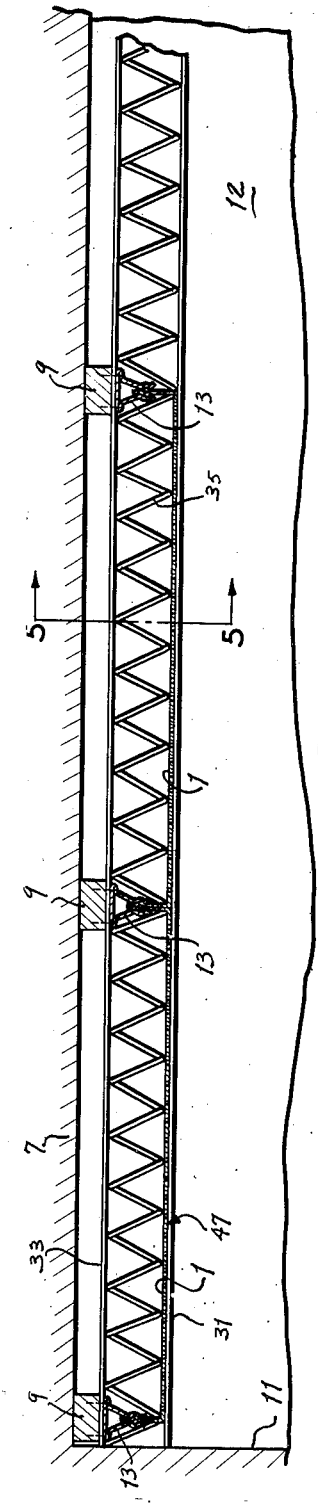
FIG. 4 is an enlarged cross section taken on line 4—4 of FIG. 3.

There is known in the art acoustical ceiling material consisting of perforated metal panel-forming pans, complete ones of which are shown at 1 in the drawings herein. Incomplete pans are shown at 2. These contain soundproofing mineral wool pads, such as shown at 3 in FIG. 3. The complete pans or ceiling members are usually about 12" wide and 24" long. They have flat bottoms with side flanges 5 and end flanges 6, separated at the corners by notches 8. The method of mounting these beneath a ceiling 7 is, for example, to attach wooden runners 9 to the ceiling parallel to and at spaced intervals from one wall 11 and perpendicular to an adjacent wall 12. Attached to the runners 9 are so-called T-runners 13.

As indicated in FIG. 7, each T-runner 13 comprises a base 15, with springy side flanges 17 which are grooved and flared as shown at 19 and 21, respectively. These are for the springing reception of the side flanges 5. The latter are inwardly ribbed, as shown at 23, for snapping into the grooves 19. The end flanges 6 of the pans extend crosswise between the T-runners 13, the notches 8 accommodating the runners. Thus when the pan flanges 5 are snapped into the T-runners 13, as shown in the drawings, the flanges 6 extend crosswise and stiffen the bottoms of the pans 1, so that they present coplanar flat surfaces, providing a flat ceiling surface.

Figure 5:
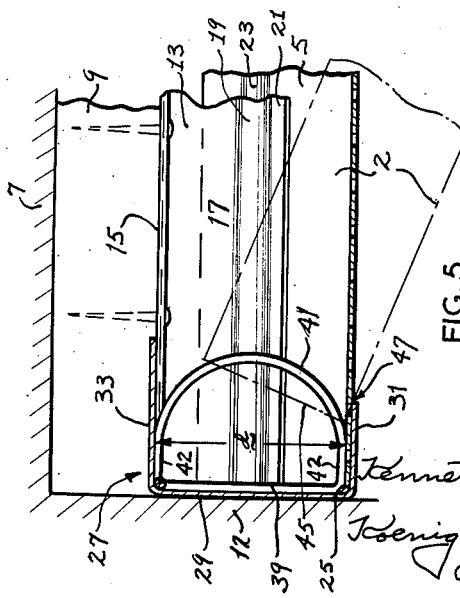
FIG. 5 is a further enlarged cross section taken on line 5—5 of FIG. 4.

A molding or channel 27 is usually provided, having a flat back 29, a bottom flange 31 and a top flange 33. This is to establish a slot for the reception of pan ends. The flat back or wall is attached to one wall 12 (FIG. 5). If the room is a whole multiple of lengths of whole pans 1, then a flange 6 is located within the molding 27 and a neat fitting results between its lower flange 31 and the bottom of the contained whole pan 1.

Often a room length is not a multiple of whole pan lengths. Therefore, as shown at 25, the whole pans need to be cut crosswise into fractional pans, as shown at 2. This leaves one end of such a cut pan without a stiffening flange 6. If a fractional pan such as 2 has its unflanged margin such as 25 inserted into such a molding 27, gaps tend to appear between the unbraced margin of the fractional pans 2 and the lower molding flange 31. Pressure clips have been introduced into the moldings to prevent this undesirable effect but these were of constructions that were difficult to place properly, they became entangled with one another during storage in bins, and they did not give entirely satisfactory results as regards closing the above-mentioned gaps throughout their entire lengths.

My new clip consists of a length of resilient spring wire 35 wound as a stretchable tension coil spring 37 with closely adjacent loops as shown in FIG. 1, for example. The loops may abut as shown, or be somewhat spaced. The wire may be approximately 1/16" in diameter and the completed coil 37 aproximately 6¾" long. The cross section of the coil 37 is D-shaped, as indicated in FIGS. 2 and 5, having an essentially flat back part 39 and an arched front portion 41. The arch 41 terminates in upper and lower flat transverse channel-gripping portions 42. The ends of the wire are inturned, as shown at 43.

Figure 6:
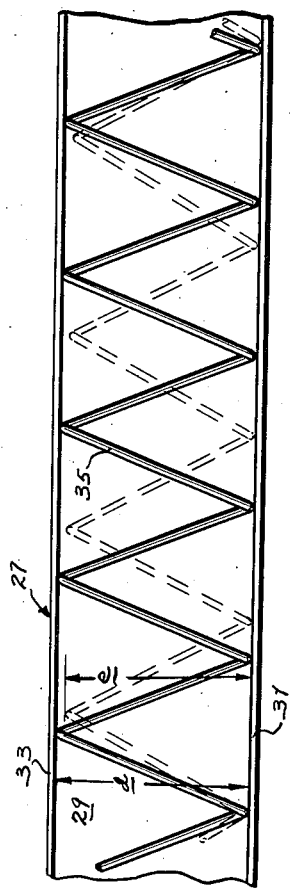
FIG. 6 is a fragmentary view of a piece of molding illustrating application thereto of the clip of the invention; and, FIG. 7 is an enlarged detail section taken on line 7—7 of FIG. 3, showing a T-runner with certain contained flanges.

The spring 37 may be stretched as illustrated in FIGS. 3, 4 and 6. In its unstretched condition (FIGS. 1 and 2) its vertical dimension D or height is larger than the inside dimension $d$ of the channel slot formed by the molding 27. However, by stretching the spring 37, as illustrated by dotted lines in FIG. 6, the dimension D may be reduced to an amount such as shown at $e$, indicated in FIG. 6, which may be a little less than the distance dimension $d$. The stretch of spring 37 for this purpose may be to the extent of ten feet or so. Under these conditions, the stretched coil 37 may be inserted flat-side first and sidewise into the channel molding 27. Space between sides of appropriate loops can be made to register with the ends of the T-runners 13 in the channel 27. Then by releasing the coil, it tends to shorten or retract axially until the dimension $e$ expands approximately to the dimension $d$, thus causing the flats 42 to engage the flanges 31 and 33. This holds the initially stretched and then partially contracted unit in the channel 27 (FIGS. 3-6). The initially stretched and partially contracted wire 35 is thus held in the channel 27 by its transverse expansive action, which enlarges the dimension $e$ to the holding dimension $d$.

Assuming that whole pans 1 have been located in the T-runners 13, fractional pans are prepared by cutting off the appropriate lengths needed and angling them into position in the T-runners 13 and molding channel 27, as shown by dotted lines in FIG. 5. They are then pushed in to the left and upward, to assume the solid-line position shown in that figure. This finally places their side flanges 5 entirely in the adjacent T-runners 13 and their flanged uncut ends in abutment with the uncut flanged ends of the adjacent whole pans 1. The unflanged portions 45 of the cut pans 2 thus become located over the lower flange 31 of molding 27 and under the lower flat 42. Thus coil 37 presses the unflanged margins 45 down on flange 31 so as to provide a neat close fit, as illustrated at 47. This fit extends throughout the width of the room by reason of the extension of the spring wire 35 substantially throughout the length of the channel 27.

It will be noted that the arched front 41 of the D-shaped spring forms a wedge-shaped guide for the cut end 25 of the pan 2 as it is angled into final position. While the D-shape of coil 37 is preferable, other equivalently functioning shapes may be employed which provide a sloping portion at the bottom when the clip is in the channel 27 such as to lead the unflanged portion of the cut pan into downwardly wedged position under the clip.

When stretched for insertion into a channel 27, the clip may average approximately ten convolutions per foot, that is, approximately ten convolutions between adjacent T-runners 13. Any T-bar may be caused to intersect a void in the clip simply by registering an appropriate void with a T-runner as needed.

It will be understood that the clip constituting the invention will be supplied in the contracted unit state shown in FIG. 1 when marketed as a product. A number of these units may be kept in a container without the entanglement that occurred with previous individual clips which were used between T-runners such as 13.

While the invention has been described in connection with perforated pans for soundproofing ceiling having the soft bats of material 3 in the pans 1 and 2, it will be understood that the soundproofing 3 may be eliminated and that the pans may be unperforated, as is sometimes the practice in making up metallic ceilings without soundproofing. For clarity in the drawings, the bat material 3 is shown only in FIG. 3, it being understood that it would appear as stippling in FIGS. 4–7 if shown therein. It is not shown therein for the reason (1) that it would confuse these figures and (2) it is not always used.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

A panel-aligning device adapted to engage and force into alignment a number of adjacently disposed ends of flanged ceiling panels located in an elongate receiving slot of a corner molding channel; comprising a substantially resilient wire of sufficient length and coiled along an axis in the form of a substantial multiplicity of closely adjacent loops to form a spring clip which is stretchable along the slot across several panels, each loop being substantially of D-shape including a back part, the height of said D-shape when the coil is unstretched being greater than the width of said receiving slot, said D shape of each loop comprising an arched front portion and opposite transverse channel-gripping portions joining the ends of the arch with said back part, said coil being adapted for sufficient axial stretch to offset said gripping portions to receive panel flanges therebetween and to tilt the back parts of the loops to reduce the height of said D-shapes to an amount less than said width of the slot, said resilient coil after stretching and insertion into the channel being adapted for sufficient retraction to increase the height of said D-shapes to wedge said offset transverse portions against the sides of the channel and against several panel margins when inserted through the slot into the channel.

References Cited in the file of this patent

UNITED STATES PATENTS

| | | |
|---|---|---|
| 276,001 | Clough | Apr. 17, 1883 |
| 1,152,406 | Clifford | Sept. 7, 1915 |
| 1,222,453 | Otte | Apr. 10, 1917 |
| 2,309,851 | Kuhne | Feb. 2, 1943 |
| 2,610,846 | Hanna | Sept. 16, 1952 |
| 2,625,360 | Hall | Jan. 13, 1953 |